May 8, 1945.                V. E. HUPP                2,375,556
                  SPACE HEATING SYSTEM FOR BUILDINGS
                    Filed Jan. 26, 1942        2 Sheets-Sheet 1
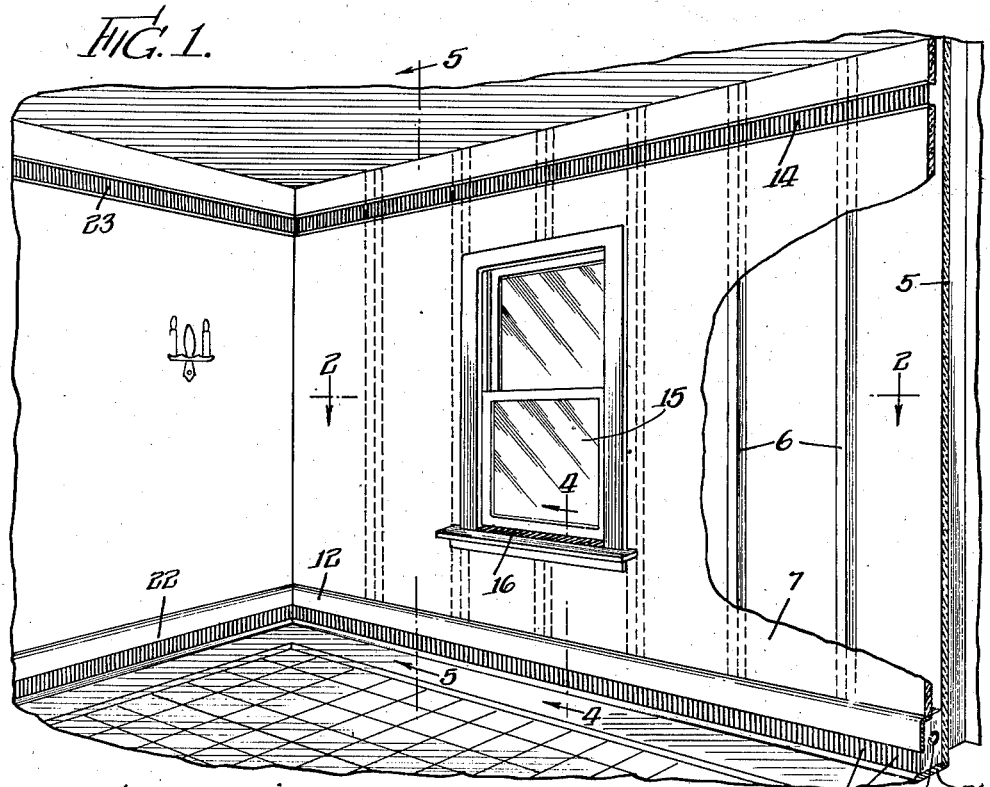
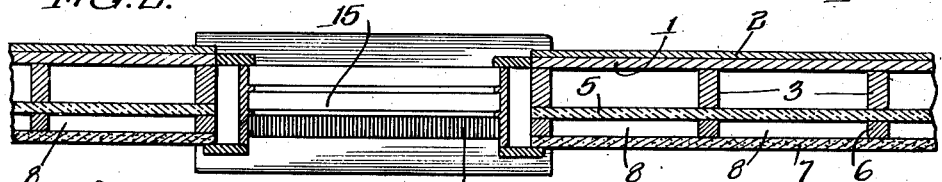
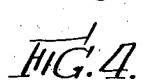
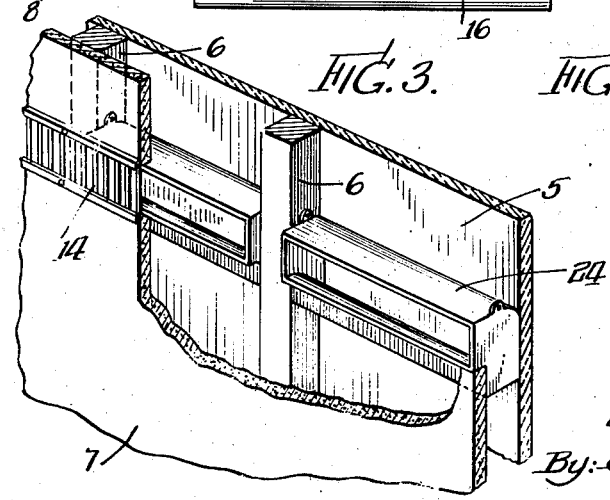
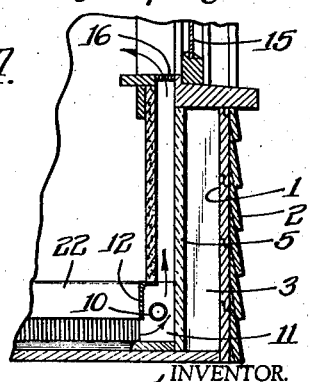
INVENTOR.
Vernon E. Hupp May 8, 1945.  V. E. HUPP  2,375,556
SPACE HEATING SYSTEM FOR BUILDINGS
Filed Jan. 26, 1942  2 Sheets-Sheet 2
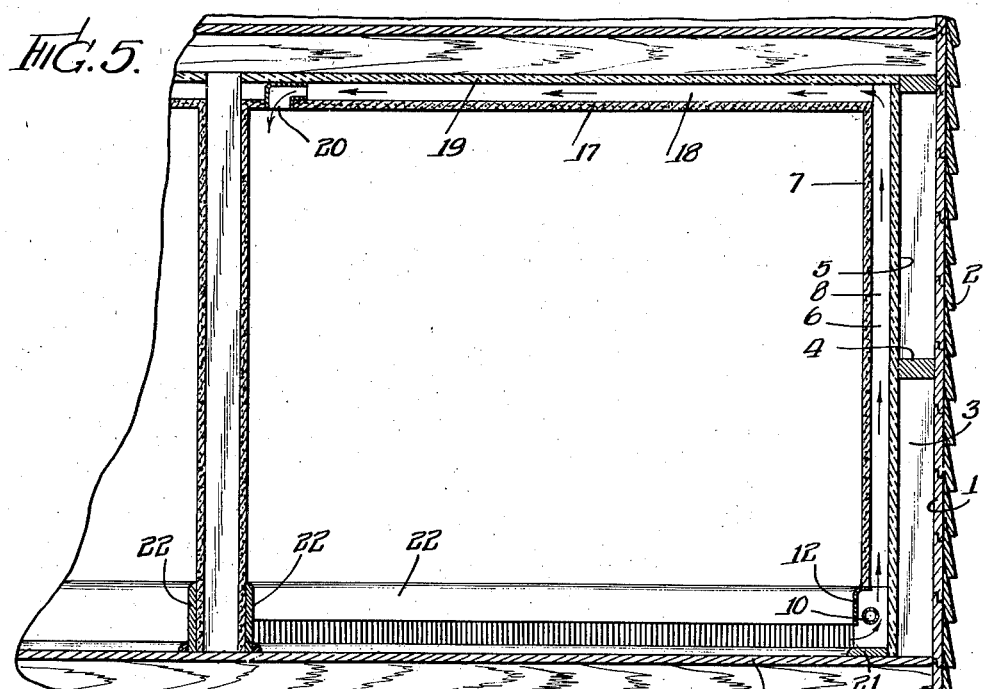
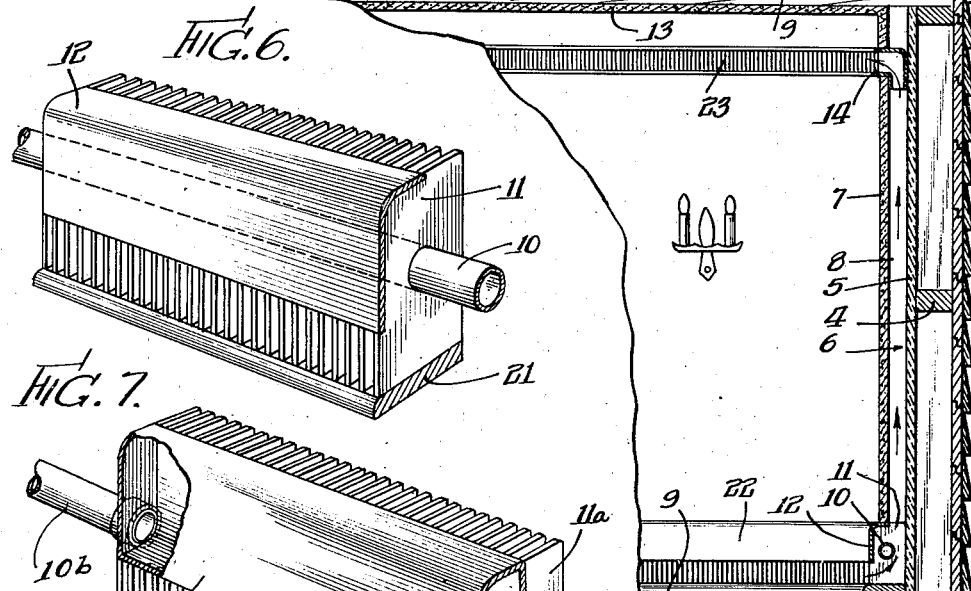
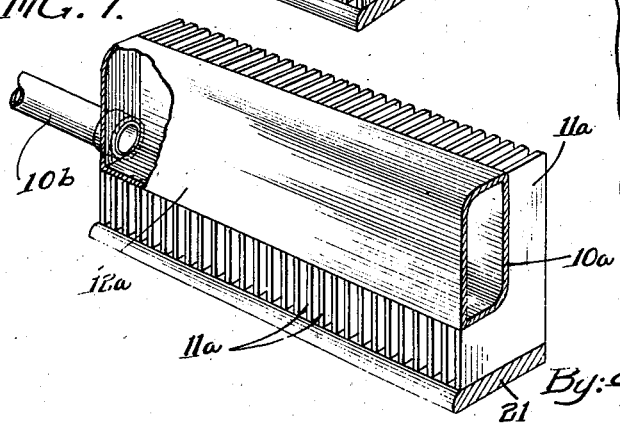
INVENTOR.
Vernon E. Hupp
By: his Atty.

Patented May 8, 1945

2,375,556

UNITED STATES PATENT OFFICE 2,375,556

SPACE HEATING SYSTEM FOR BUILDINGS

Vernon E. Hupp, Chicago, Ill.

Application January 26, 1942, Serial No. 428,163

1 Claim. (Cl. 257—136)

This invention is directed to a heating system for buildings, and it is applicable both to residence structures and to commercial buildings, but it is illustrated herein as embodied in a familiar type of domestic architecture.

One object of the invention is to provide a simplified heat radiating apparatus which shall be easy to install and economical to maintain.

Another object is to provide a heating system which utilizes standard features of building structure as elements of the heat distributing means, and to furnish certain elements of the heating apparatus in such form that they may serve also as elements of the building structure.

More specifically, the invention undertakes to employ existing or regularly provided spaces in the wall structure of a building as distributing conduits for heated air supplied to a given space or room through outlets in such walls, and also to provide radiant heating elements in the form of baseboard units associated with the conduit spaces in the walls and arranged to include air inlets to secure the circulation of air through such spaces.

It is a particular object of the invention to provide means for heating the entire area of those portions of the walls of a room which are also exterior walls of the building by producing a continuous directed circulation of heated air through spaces within such walls.

It is also an object of the invention to provide a space heating apparatus which operates by direct radiation from a heating unit, indirectly by the transfer of heat to the air of a room and circulation of such air, and finally by radiation from the walls of the room as a result of circulating the heated air through spaces in such walls.

Other objects and advantages of the invention will appear from the following description taken in connection with the accompanying drawings, in which:

Figure 1 is a perspective view showing a portion of a room provided with a heating system embodying this invention, a part of the inner wall being broken away.

Figure 2 is a horizontal section taken through the wall structure substantially as indicated at line 2—2 on Figure 1.

Figure 3 is a fragmentary detail view in perspective showing the construction of the air outlet ducts and grille.

Figure 4 is a vertical detail section taken as indicated at line 4—4 on Figure 1.

Figure 5 is a vertical section taken at line 5—5 on Figure 1 and showing in addition the heating arrangement for a room on the next floor above and directly under the roof.

Figure 6 is a perspective detail view of a portion of a radiating unit for my heating system.

Figure 7 is a perspective view of a modified form of radiating unit.

While the invention is susceptible of various modifications and alternative constructions, the embodiments shown in the drawings and described hereinafter are by way of preferred illustration only, and it is not intended that the invention be limited thereto or thereby, but it is the intention to cover all modifications and alternative constructions falling within the scope of the invention as defined by the claim.

The drawings show my heating system as applied to a dwelling or like building of frame construction in which the outer wall includes the usual sheathing 1 of ship-lap or the like overlaid with clapboards 2. These elements are supported on the vertical members 3, known as studding, with horizontal fire stops 4 extending at intervals between them. A dead air space is provided between the sheathing 1 and a layer or panel 5 which is preferably of heat insulating material, such as the commercial product known as Celotex. Vertically extending furring strips 6 are secured over the panel 5 and support the innermost wall panel 7, which may consist of lath and plaster, or of plasterboard or other wallboard suitable for interior finish. It may be understood that my heating system is in no way dependent upon the external construction of the building wall, and that it might be applied to a brick building with equal facility, the frame structure just described being chosen merely for purposes of illustration. However, it is a feature of my invention to utilize the spaces 8 formed between the wall panels 5 and the inner panels 7 and to take advantage of the fact that these spaces are subdivided into vertically extending passages by the furring strips 6.

A portion of a typical room is shown in Fig 1 with the novel elements of my heating system applied thereto, and the lower portion of Fig. 5 indicates the details of the arrangement in section. The insulating panel 5 extends to the floor 9 but the inner wall panel 7 of plaster or wallboard terminates above the floor level, leaving a space which is usually enclosed by the so-called "baseboard." At the wall of the room, which is an exterior wall of the building, I substitute for the baseboard a heat radiating unit or structure which includes a pipe or conduit 10 extending horizontally with heat radiating metallic fins 11 spaced along the pipe 10 at frequent intervals and extending in vertical planes directly below the spaces 8. The upper portions of the front edges and the forward portions of the upper edges of the fins 11 are enclosed by an angular cover plate 12 leaving the lower portions of the fins exposed to form a grille through which air is admitted from the lower portion of the room for circulation upwardly through the spaces 8. This circulation is induced by the heating of the air as it comes in contact with the pipe 10 containing heating fluid such as hot water or steam and as it absorbs heat from the pipe and from the fins 11. Near the ceiling 13 the wall 7 is formed with a horizontally extending opening which may be covered by an ornamental grille, as seen at 14, to form an outlet for the heated air rising in the passages or spaces 8. This warmed air then circulates through the room, transmitting its heat to the walls and objects in the room and falling as it cools so as to be again drawn into the inlet grille formed by the fins 11 and reheated and recirculated.

Where the wall includes a window, such as that shown at 15 in Fig. 1, the vertical passages between the furring strips 6 are interrupted by the window, but the lower portions of these passages directly below the window may terminate in a grille 16 set in the window sill so that a constant flow of heated air is maintained over the surface of the window and toward the upper portion of the room. In the case of an upper room, such as a bedroom in the second story of a residence building, and located directly under the roof or attic space, it may be found preferable to connect the passages 8 in the vertical wall with similar passages 18 formed between the inner panel 17 which constitutes the ceiling of the room and the panel 19, which is preferably of insulating material, such as Celotex. These passages 18 then lead to a suitable outlet, as indicated at 20 in Fig. 5, for discharging the heated air downwardly into the room for eventual recirculation through the baseboard grille of the heating unit.

It may be understood that heating fluid, such as steam or hot water, will be supplied to the pipes 10 by any suitable connecting piping and from any conventional type of furnace or boiler, and it will be evident that these conduits might be replaced with electrical heating coils or elements arranged in any conventional manner for radiating heat to the spaces 8 in the walls. Fig. 6 shows the pipe form of conduit 10, and Fig. 7 shows a modification in which the conduit 10ª is substituted for the pipe 10 and is made of substantially rectangular cross section with the angular cover plate 12ª forming the front and top walls of the conduit. A feed pipe 10ᵇ is shown connected into one end of such conduit. In both constructions, a base or bottom board 21 is provided as a part of the baseboard unit, being arranged to rest upon the floor 9 and being secured to the lower edges of the fins 11 or 11ª by any suitable means. As indicated in the drawings, the appearance of the exposed front of the heating unit, consisting of the cover plate 12 and the grille formed by the fins 11, may be duplicated or simulated in baseboard trim members 22, and similarly the appearance of the outlet grille 14 may be simulated by trim mouldings 23 which may actually include slotted metallic grille members identical with those employed at 14, or which may be merely strips of moulding painted or embossed to resemble these grilles. But where the baseboard heating units are employed, the regular baseboard is dispensed with.

A special feature of this heating system is that, when it is applied to exterior walls of the building, these walls are kept warm by the constant flow of heated air through the spaces in them, instead of being colder than the other walls of the room, as is frequently the case when the source of heat is an ordinary steam or hot water radiator or hot air register, confined to a comparatively small space in the room. Furthermore, the supply of warm air at the window sills overcomes the usual chilling effect of cold window panes, so that a more uniform temperature is maintained throughout the room, keeping all portions of it comfortable and healthful for use. It may be understood, however, that wherever necessary the distribution of heat may be effected by the application of this system to the interior partitions or some of them, as well as to the exterior walls of the building.

Thus, it will be seen that this system involves, first, the direct, radiant effect from the heating elements to the room; second, the transmission of heat by convection of the air flowing through or around the heating elements and through the spaces within the walls and ceiling of the room, and discharging into the room through the outlet grilles; and, third, by the warming of the inner wall panels and the radiant effect from the surfaces of the walls and ceiling to the air within the room. In other words, the system may be considered as a combination of direct, indirect, and radiant heating. With this system, the horizontal extension of the heating unit through at least the length of one side of the room insures the rapid transmission of heat to the air in all the vertical spaces 8 in this wall and the rapid distribution of heat to the room from the outlet grille 14 or from the ceiling grille 20. By virtue of the wide distribution of the heating effect, a lower temperature of the heating fluid in the conduit 10 can be employed efficiently, and the temperature of the fins 11 and their cover plate 12 can be lower than the temperature of conventional steam or hot water radiators. Furthermore, the stack effect secured by the subdivision of the spaces in the walls into relatively narrow, vertical spaces between the furring strips 6 insures the induced flow of air as a result of the heat radiated from the baseboard unit. If desired, these vertical passages may be provided with metal linings, although in most instances this will be unnecessary. As a matter of convenience, Fig. 3 shows metallic outlet boxes 24 adapted to be fitted between the furring strips 6 and behind the grille 14, these boxes being formed with a smoothly rounded contour, rendering the back wall and top wall of the air passage substantially continuous and thus facilitating the flow of air to the outlet.

Fig. 6 is illustrative of a portion of a radiator structure comprising a pipe or conduit with associated fins and cover plate. The fins and cover plate may be formed separately from the pipe and the parts then secured together by shrinking, welding or other methods well known in the art. Generally it is preferable to form the radiator structure with the fins and cover plate cast integrally with the pipe. In either form the radiators may be made up in standard lengths with end fittings or nipples for pipe connections as shown in the form of Fig. 7.

I claim as my invention:

In a building, in combination with a room having an outer wall and a ceiling, each said outer wall and said ceiling including an external wall panel, an intermediate wall panel spaced inwardly from said external panel to provide insulating space preventing direct exposure of the outer surface of said intermediate panel to atmosphere, and an inner wall panel exposed toward the room and spaced inwardly from said intermediate panel, a plurality of horizontally spaced and vertically extending strips between the inner and the intermediate panels of said outer wall cooperating therewith to form vertically extending, shallow, hot air ducts lying behind the inner panel of said outer wall over substantially the entire area thereof, a plurality of laterally spaced, horizontally extending strips between the inner and the intermediate panels of said ceiling cooperating therewith to form horizontally extending, shallow, hot air ducts lying behind the inner panel of said ceiling over substantially the entire area thereof, the ducts so formed in the ceiling being continuations of and in communication with the ducts in said outer wall, the intermediate panel of said outer wall extending from the floor to the intermediate panel of said ceiling, and the inner panel extending from the inner panel of said ceiling to a distance above the floor providing a baseboard opening along the entire lower edge of the inner panel of said outer wall leading to the ducts formed in said outer wall, a radiant heating element extending horizontally adjacent the floor level below said ducts in the outer wall and with its front surface exposed through said opening so as to permit radiant heat to pass from said element directly into the room, said opening permitting air from the room to pass therethrough and across said heating element to be heated thereby and pass up into the ducts in said outer wall and said ceiling to warm the inner wall panels thereof which in turn radiate heat to the room, and an elongated outlet formed in the inner panel of said ceiling parallel with said outer wall but remote therefrom to permit the discharge of heated air into the room, said outlet extending across substantially the entire ceiling and being in communication with each of the ducts formed in the ceiling.

VERNON E. HUPP.